Jan. 30, 1934.　　　G. J. STREZYNSKI　　　1,945,336
CENTRIFUGAL SEPARATOR BOWL
Filed Aug. 1, 1930　　　2 Sheets-Sheet 1

WITNESS:
Robt R. Kitchel

INVENTOR
George J. Strezynski
BY
Busser and Harding
ATTORNEYS.

Jan. 30, 1934.  G. J. STREZYNSKI  1,945,336
CENTRIFUGAL SEPARATOR BOWL
Filed Aug. 1, 1930  2 Sheets-Sheet 2

WITNESS:

INVENTOR
George J. Strezynski
BY
Busser and Harding
ATTORNEYS.

Patented Jan. 30, 1934

1,945,336

UNITED STATES PATENT OFFICE 1,945,336

CENTRIFUGAL SEPARATOR BOWL

George J. Strezynski, Poughkeepsie, N. Y., assignor to The De Laval Separator Company, New York, N. Y., a corporation of New Jersey Application August 1, 1930. Serial No. 472,277

9 Claims. (Cl. 233—46)

Centrifugal separator bowls of the same construction and size vary greatly in efficiency and capacity, notwithstanding the fact that they are manufactured with great care and accuracy; and they all fall short, in varying degrees, of their theoretical efficiency and capacity. My investigations demonstrate that the chief factor which causes bowls to fall short of their theoretical efficiency and capacity is the failure of the center of gravity of the bowl and its geometric center to precisely coincide; the impairment in the maximum efficiency and capacity of the bowl varying directly, although not necessarily precisely proportionately, with the degree of divergence between the two centers. The degree of this impairment is often suprisingly great.

The reason why the above condition of departure from the geometric center of the bowl of the center of gravity impairs the efficiency and capacity of the bowl will be clear from the following explanation. A rapidly revolving bowl of course rotates about its center of gravity. When this center does not coincide with the bowl's geometric center, the circular discharge weirs are necessarily more or less eccentric to the axis of rotation. This causes a greater discharge from the side of the bowl furthest from the axis of rotation, which results in a greater flow through that side of the bowl. When it is borne in mind that the thickness of the liquid stream flowing over the weir is slight and that the difference in depths of the streams flowing over the weir at these opposite sides of the bowl is double the difference between the two centers above mentioned, it will be clearly understood that the largest proportion of the work is being done in that sector of the bowl from which there is the greatest discharge. That is, only this section of the bowl is functioning with maximum efficiency. The rapid flow of liquid through this section of the bowl carries into the concentrated lighter component some of the heavier component, and vice versa, thus making impossible a complete separation of components having small difference in specific gravity.

In the case of separation of liquids from solids, with deposit of some or all of the solids on the bowl wall, it is clear that the described condition causes an unequal deposit of solids with resultant further unbalancing of the bowl and a still less efficent use of the separating capacity in the sector of the bowl in which there is a lesser flow.

In practical operation, all the discharge may occur along only a part of the circumference of the weir.

One of the objects of the invention is to insure, regardless of lack of perfect balance, a substantially equal outflow of liquid around the entire circumference of the bowl so that all sectors of the bowl will be substantially equally effective; that is, will be used to a substantially equal degree, in the separating or clarifying operation. In other words, the object of the invention is to compel the bowl to function with an efficiency not substantially less than if the bowl were maintained in perfect balance.

There is another factor which, to a lesser but substantial degree, causes inequality of rate of flow and unequal distribution of the separating work in different sectors of the bowl. Such factor is especially strongly operative where it is required to remove, in a bowl equipped with a "liner", a minor amount of heavy material from a major quantity of lighter material; it being customary, in such cases, to feed the mixture into the separating chamber of the bowl at a zone outside the liner. In such bowls, there is usually a central chamber into which the mixture is fed and through which it travels and out of which it is fed to the separating chamber through a number of approximately round or approximately square holes, not less than three in small bowls nor more than eight in large bowls. The "liner", as is well understood, comprises, usually, a set of superimposed conical discs which divide the liquid into thin layers oblique to the direction of action of centrifugal force.

The result of so feeding into the bowl through a number of spaced apart holes is to cause, in these thin spaces, as many narrow sectors of rapid flow as there are holes, and, between these sectors, an equal number of sectors of comparatively slow flow.

In my invention the liquid is fed to the separator chamber of the bowl throughout its periphery with substantial uniformity.

It will be understood that, in the ordinary bowl, wherein the rate of flow within the bowl is unequally distributed, the rate of feed for the entire bowl must be kept low enough to insure good work on the material flowing at the highest speed. In my improved bowl there are no zones of relatively rapid and slow flow, so that the total feed may be increased over that permissive in the ordinary bowl without reduction of quality of work.

A bowl showing one embodiment of my invention is illustrated in the accompanying drawings, in which—

Figure 3:
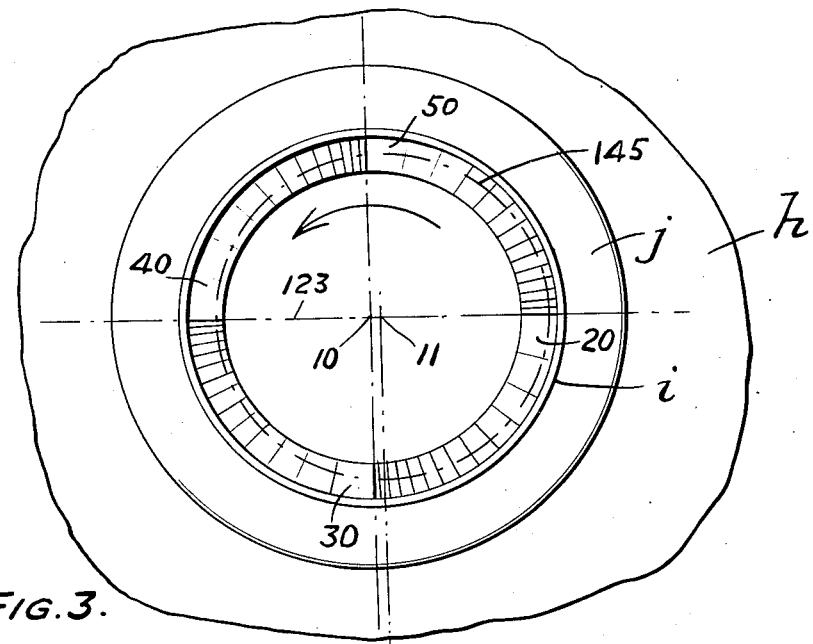
Fig. 3 is a plan of Fig. 2.
Figure 2:
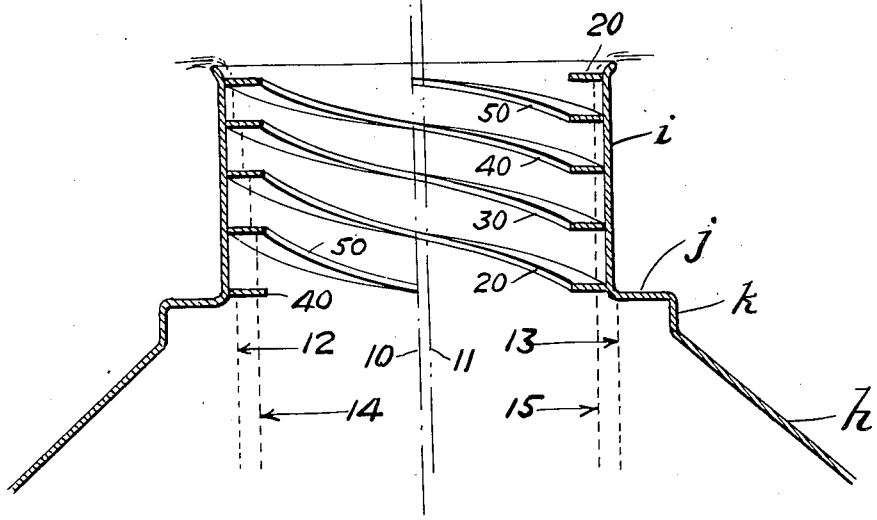
Fig. 2 is an enlarged vertical section through the means for discharging the lighter liquid.

In both Figs. 2 and 3 the discharge neck is shown as somewhat exaggeratedly eccentric to the axis of rotation.

To the bowl shell $a$ is secured the bowl top $b$ by means of the coupling ring $c$ screw-threaded on the shell. The "liner" $d$ comprises a number of frusto-conical "discs" which, to provide thin separating spaces, are held apart by the usual caulks, not shown. The liner rests on the expanded lower portion $e$ of the tubular shaft $f$ and is held down by a top disc forced downward by wings $g$ on the underside of the bowl top $b$. The frusto-conical main portion $h$ of the top disc has an upstanding neck $i$ which, as in the usual construction, is joined to the main portion $h$ by a horizontal step $j$ and a cylindrical portion $k$.

The bowl is supported and driven by the spindle $m$. Through a tube $n$ the mixture to be separated is fed into the interior of the tubular shaft $f$, from which it is delivered to the bowl chamber. The covers $o$, $p$ and $r$ catch the discharges from the bowl.

So far as described, the bowl is illustrative of a type of bowl in common use.

When liquid is fed into a centrifugal bowl, it is thrown out against the inside of the shell and fills the bowl from the outside inward. The inside surface of the liquid is a paraboloid of revolution which, with speeds ordinarily used in centrifugal separators, is practically a cylinder, having its axis coincident with that of the center of gravity and of revolution.

Let it be assumed that the bowl, so far as it is described, is not in perfect balance and hence that the geometric axis does not coincide with the axis of rotation. To illustrate this condition, let it be assumed that 10 is the geometric axis of the bowl and 11 the axis of rotation eccentric to 10. The neck of the bowl is then eccentric to the axis of rotation and to the cylindrical inside surface of the liquid shown in 12 and 13 in Fig. 2, on the diametric line 123 of Fig. 3. As the bowl fills and the inside of the liquid cylinder assumes this position, that is, passes the point of greatest eccentricity, a discharge will begin at that point, causing a flow through the corresponding section of the bowl while there is no discharge from or flow through other sections.

To avoid this condition I insert inside the neck $i$ helical guides 20, 30, 40 and 50 providing between them a plurality of helical troughs around which the liquid must flow to reach the exit. Liquid starting up the side of greatest eccentricity will strike one of the helical guides and be compelled to travel around the neck on its way out. It must, therefore, before it can escape, pass the point of least eccentricity. To force it to do this, the inner wall of liquid must move inward to the circle 145 in Fig. 3, two diametrically opposite points of which are marked 14 and 15 in Fig. 2, when, from all sections, there will be discharges which, because they must all pass the point of least eccentricity, will meet equal resistance and be of equal volume.

The number of helical troughs may be varied. It is possible to obtain good results with two troughs, but it is preferred to employ three or more troughs. The troughs need not be shaped as helices of uniform pitch, it being possible to vary the pitch of each trough from end to end. In fact, the greatest theoretical benefit can be obtained by a multiplicity of troughs having pitches progressively varying from infinity at the bottom to less than the radius at the top. The troughs in the drawings show a departure from uniform pitch toward the pitch of theoretical maximum efficiency.

It is preferred to have each helical trough make at least one complete circuit of the neck; but the advantage of my invention may be secured, in some degree, by troughs which make as little as one-half of a complete circuit.

Equalization of flow may be obtained by means of troughs extending in either direction, but if they turn backward relative to the rotation of the bowl the discharged liquid will have an absolute velocity less than that of the part of the bowl from which it makes its final escape, thus producing less froth and a smaller loss of kinetic energy. In fact, a minor, but important, advantage of my invention, as compared with the ordinary separator bowl, especially when the troughs extend in the preferred direction, is that aeration and frothing of the discharged liquid is reduced to a minimum.

Figure 1:
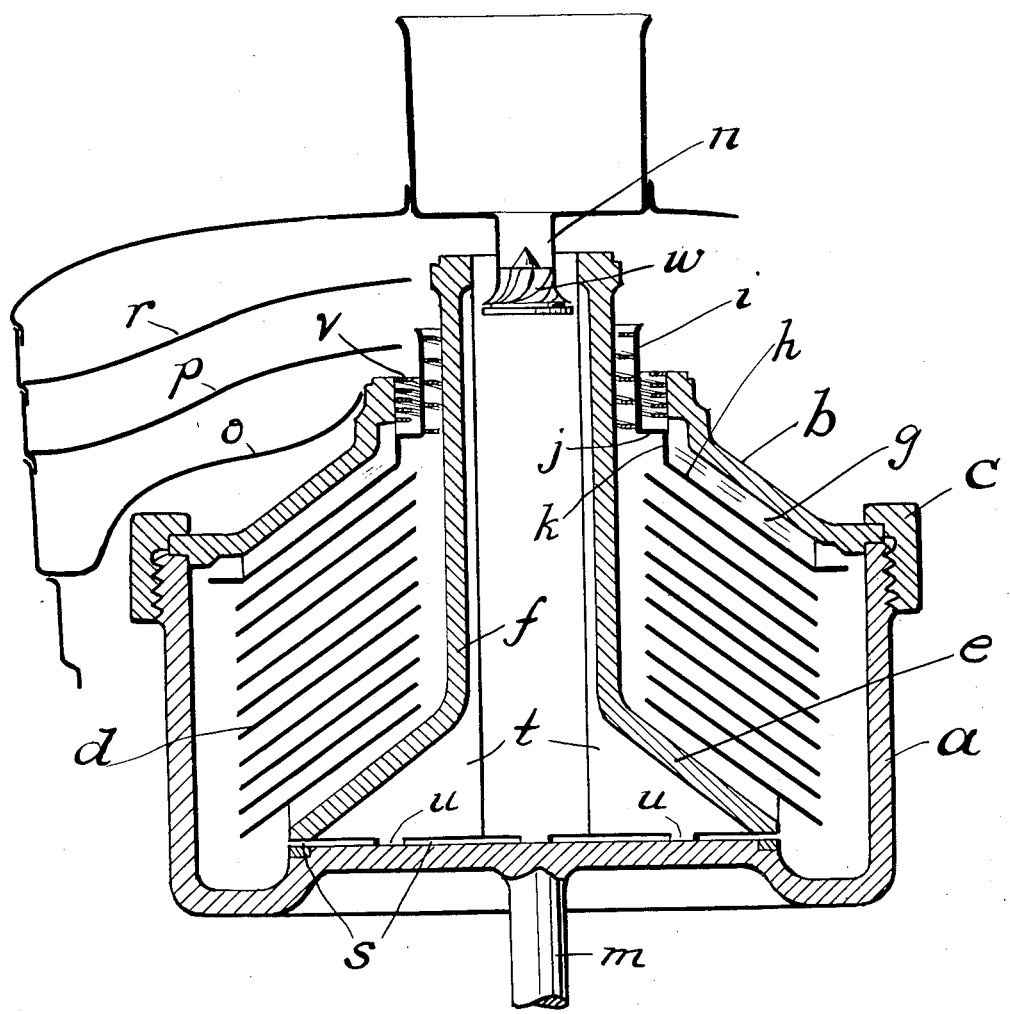
Fig. 1 is a vertical sectional view of a centrifugal separator bowl of known type modified to embody my inventions.

The invention has been described as applied to the discharge outlet for the lighter separated liquid. It may be applied, with equal facility and similar advantage, to the outlet for the heavier liquid or substance, as shown in Fig. 1 at $v$. The invention is also applicable to a purifier or clarifier in which there is only one liquid outlet. This requires no special description, since the construction may be substantially as shown in Fig. 1, modified by closing the light liquid outlet.

The means above described for insuring equalization of outflow around the periphery of the bowl tends, as described, toward equalization of flow throughout all sectors of the separating chamber. Such equalization of flow, however, cannot be obtained in maximum degree if an ordinary separator were equipped with the improved discharge means described, owing to the fact, hereinbefore pointed out, that the usual means for introducing into the bowl the mixture to be separated tends to produce spaced apart sectors of comparatively rapid flow corresponding to the spaced apart holes through which the mixture flows into the separating chamber from the tubular shaft or receiving chamber $f$.

In my improved bowl this tubular shaft $f$ is provided, near its bottom, with a more or less complete annular opening $s$, preferably so narrow in height that its outflow capacity need not exceed the combined capacity of the usual spaced apart holes. Inside the tubular shaft are several wings $t$.

In operation, liquid from the tube $n$ falls inside the tubular shaft, where it is caught by the wings $t$ and forced to rotate at the same speed as the bowl. This generates centrifugal force which causes a high pressure at the entrance to the annular opening $s$. This opening is so narrow that there is considerable pressure drop through it; hence the entire length of the opening, which is made, preferably, as nearly as possible the full circumference of the tubular shaft, is used for flow and the feed to the bowl proper is uniform for all sectors. After escaping through the narrow opening $s$ the liquid flows into the space between the discs of the liner $d$ where, as it is forced toward the center, the lighter component leaves behind it the heavier one, which flows outward along the underside of the discs, collects against the inside of the bowl shell $a$ and eventually flows up between the top discs and the bowl top and, through the neck of the bowl top, escapes into the cover $o$. The lighter component, after passing between the discs, flows upward inside them and, through the neck $i$ of the top disc, escapes into the cover $p$.

While I have stated that the opening $s$ is substantially complete throughout its circumference, it is not necessary that the opening should be absolutely continuous. For example, the use of spaced apart connecting members $u$ of comparatively short arcuate length is not prohibited and may be necessary from a structural standpoint. All that is required is that, in the case of openings spaced apart by connecting members, the openings shall be substantially uniformly distributed around the circumference and that their total arcuate length shall substantially exceed, and preferably be at least three times the length of, the total arcuate length of the connecting members, in order to avoid the production in the bowl of alternating sectors of respectively rapid and slow flow.

It is obvious that great advantages can be secured by control, by the means herein described, of only the outflow, and that a very appreciable improvement in the efficiency and capacity of the bowl, especially when a minor amount of heavy material is to be separated from a major quantity of lighter liquid, may be secured by control, by the means herein described, of the inflow. The conjoint use of the two control means is adapted to effect an improvement in efficiency and capacity which is extraordinary in view of the advanced state of the centrifugal separator art.

Having now fully described my invention, what I claim and desire to protect by Letters Patent is:

1. In a centrifugal bowl provided with a separating chamber of relatively large diameter in which substances of different specific gravities are adapted to be separated and provided with a cylindrical discharge neck of relatively small diameter through which one of the separated substances is adapted to be discharged, means, rotatable with said bowl and neck and extending along said neck, providing a plurality of helical discharge passages through which the outflowing separated substance is constrained to flow in said neck.

2. In a centrifugal bowl provided with a separating chamber of relatively large diameter in which substances of different specific gravities are adapted to be separated and provided with a cylindrical discharge neck of relatively small diameter through which one of the separated substances is adapted to be discharged, means in said neck and rotatable therewith providing a plurality of helical discharge passages, the inner ends of which are adapted to receive a substance separated in the bowl and the outer ends of which are adapted to discharge said substance.

3. In a centrifugal bowl provided with a separating chamber of relatively large diameter in which substances of different specific gravities are adapted to be separated and provided with a cylindrical discharge neck of relatively small diameter through which one of the separated substances is adapted to be discharged, means, rotatable with said bowl and neck, providing a helical discharge passage through which the outflowing separated substance is constrained to flow in said neck, said passage having a lesser pitch at its discharge end than at its entrance end.

4. In a centrifugal bowl provided with a separating chamber of relatively large diameter in which substances of different specific gravities are adapted to be separated and provided with a cylindrical discharge neck of relatively small diameter through which one of the separated substances is adapted to be discharged, means, rotatable with said bowl and neck, providing a plurality of helical discharge passages through which the outflowing separated substance is adapted to flow in said neck, each of said passages having a lesser pitch at its discharge end than at its entrance end.

5. In a centrifugal bowl provided with a separating chamber of relatively large diameter, in which substances of different specific gravities are adapted to be separated, a cylindrical discharge neck of relatively small diameter and means constraining the heavier separated substance to flow from the peripheral portion of said chamber to said neck, means providing a plurality of helical discharge passages extending along said neck and rotatable with said bowl and neck and through which said substance is constrained to flow in said neck.

6. In a centrifugal bowl provided with a separating chamber of relatively large diameter in which substances of different specific gravities are adapted to be separated and a cylindrical discharge neck of relatively small diameter into which the lighter separated substance is adapted to flow, means providing a plurality of helical discharge passages extending along said neck and rotatable with said bowl and neck and through which said substance is constrained to flow in said neck.

7. In a centrifugal bowl provided with concentric discharge necks communicating respectively with the central and peripheral parts of the bowl, means providing in each neck a plurality of helical discharge passages extending along and rotatable with said neck and through which the separated substance is constrained to flow.

8. In a centrifugal separator bowl, the combination of a central receiving chamber, a separating chamber of relatively large diameter, a discharge neck of relatively small diameter communicating with the separating chamber, there being an opening between said chambers through which the substance to be separated is adapted to flow in a relatively thin substantially circumferential stream, and with such pressure drop as to effect substantially uniform distribution of the substance through all sectors of the bowl, and means constraining every particle of the separated substance discharging through said neck to make not less than one-half a complete circuit, whereby the rate of flow of the substance being separated may be maintained approximately uniform within the separating space of the bowl.

9. In a centrifugal bowl provided with a separating chamber of relatively large diameter in which substances of different specific gravities are adapted to be separated and provided with a cylindrical discharge neck of relatively small diameter through which one of the separated substances is adapted to be discharged, means within and extending along said neck and rotatable therewith providing a plurality of helical discharge passages the inner ends of which are adapted to receive a substance separated in the bowl and the outer ends of which are adapted to discharge said substance, said helical passages extending at least half way around the bowl neck, thereby effecting substantial equalization of outflow around the periphery of the bowl and effecting also approximate equalization of flow throughout all sectors of the separating chamber.

G. J. STREZYNSKI.